(12) United States Patent
Xu et al.

(10) Patent No.: US 7,615,170 B2
(45) Date of Patent: Nov. 10, 2009

(54) METHOD OF PROCESSING POLYMERS USING A SINGLE SCREW

(75) Inventors: Jingyi Xu, York, PA (US); Juan C. Cardona, Lowell, MA (US); Levi A. Kishbaugh, Groveland, MA (US)

(73) Assignee: Trexel, Inc., Woburn, MA (US)

( * ) Notice: Subject to any disclaimer, the term of this patent is extended or adjusted under 35 U.S.C. 154(b) by 387 days.

(21) Appl. No.: 11/027,191

(22) Filed: Dec. 30, 2004

(65) Prior Publication Data

US 2005/0143479 A1 Jun. 30, 2005

Related U.S. Application Data

(62) Division of application No. 10/198,643, filed on Jul. 18, 2002, now Pat. No. 7,318,713.

(51) Int. Cl.
B29C 44/38 (2006.01)
(52) U.S. Cl. .......................................... 264/50; 264/53
(58) Field of Classification Search .................. 264/50, 264/51, 53
See application file for complete search history.

(56) References Cited

U.S. PATENT DOCUMENTS

| | | | |
|---|---|---|---|
| 3,436,446 A | | 4/1969 | Angell |
| 3,637,458 A | * | 1/1972 | Parrish ..................... 428/314.2 |
| 3,687,582 A | | 8/1972 | Handry et al. |
| 4,096,218 A | | 6/1978 | Yasuike et al. |
| 4,124,308 A | | 11/1978 | Sokolow |
| 4,229,395 A | | 10/1980 | Nagumo et al. |
| 4,473,665 A | | 9/1984 | Martini-Vvedensky et al. |
| 4,512,733 A | | 4/1985 | Eichlseder et al. |
| 4,783,292 A | | 11/1988 | Rogers |
| 5,124,095 A | | 6/1992 | Gianni et al. |
| 5,158,986 A | | 10/1992 | Cha et al. |
| 5,160,674 A | | 11/1992 | Colton et al. |
| 5,164,207 A | | 11/1992 | Durina |

(Continued)

FOREIGN PATENT DOCUMENTS

EP 0 818 292 A2 7/1997

(Continued)

OTHER PUBLICATIONS

International Search Report, Application No. PCT/US03/22322, mailed Jan. 13, 2004.

(Continued)

*Primary Examiner*—Robert B Davis
(74) *Attorney, Agent, or Firm*—Wolf, Greenfield & Sacks, P.C.

(57) ABSTRACT

Injection molding and blow molding systems that include screws having low L:D ratios are provided. The systems are capable of producing microcellular polymeric materials. In some cases, the systems may be formed by retrofitting conventional polymer processing systems. Retrofitting may involve changing (e.g., machining or replacing) existing components of the conventional system, as well as, adding new components to the system. For example, retrofitting generally involves replacing the conventional polymer processing screw with a new screw designed to satisfy conditions needed for processing microcellular materials. In other cases, the systems may be newly manufactured. The retrofitted or newly manufactured systems of the invention are considerably less expensive than newly manufactured microcellular processing systems having higher L:D ratios.

25 Claims, 9 Drawing Sheets

U.S. PATENT DOCUMENTS

| | | |
|---|---|---|
| 5,258,158 A | 11/1993 | Dray |
| 5,334,356 A | 8/1994 | Baldwin et al. |
| 5,866,053 A | 2/1999 | Park et al. |
| 5,932,154 A * | 8/1999 | Csongor et al. ............ 264/40.3 |
| 6,005,013 A | 12/1999 | Suh et al. |
| 6,051,174 A | 4/2000 | Park et al. |
| 6,169,122 B1 | 1/2001 | Blizard et al. |
| 6,231,942 B1 | 5/2001 | Blizard et al. |
| 6,235,380 B1 | 5/2001 | Tupil et al. |
| 6,284,810 B1 | 9/2001 | Burnham et al. |
| 6,294,115 B1 | 9/2001 | Blizard et al. |
| 6,322,347 B1 | 11/2001 | Xu |
| 6,376,059 B1 | 4/2002 | Anderson et al. |
| RE37,932 E | 12/2002 | Baldwin et al. |
| 6,579,910 B2 | 6/2003 | Xu |
| 6,593,384 B2 | 7/2003 | Anderson et al. |
| 6,602,063 B1 | 8/2003 | Cardona |
| 6,602,064 B1 | 8/2003 | Chen et al. |
| 6,613,811 B1 | 9/2003 | Pallaver et al. |
| 6,616,434 B1 | 9/2003 | Burnham et al. |
| 6,659,757 B2 | 12/2003 | Kim et al. |
| 2001/0033040 A1 | 10/2001 | Cardona et al. |
| 2002/0009584 A1 | 1/2002 | Boyer |
| 2002/0024165 A1 | 2/2002 | Xu |

FOREIGN PATENT DOCUMENTS

| | | |
|---|---|---|
| EP | 0 799 853 A1 | 10/1997 |
| JP | 2000 052408 A | 2/2000 |
| JP | 2002-138157 | 5/2002 |
| WO | WO 98/08667 | 3/1998 |
| WO | WO 98/31521 | 7/1998 |
| WO | WO 00/31170 | 6/2000 |

OTHER PUBLICATIONS

Mikell Knights, "Microcellular Moulding Takes Off," Plastics Technology 'Online!, Sep. (2000).

Patent Abstracts of Japan, Publication No. JP 2001 198961 A, vol. 2000, No. 24, May 11, 2001.

Patent Abstracts of Japan, Publication No. JP 2000 052408 A, vol. 2000, No. 5, Sep. 14, 2000.

* cited by examiner

METHOD OF PROCESSING POLYMERS USING A SINGLE SCREW

This patent application is a divisional application of U.S. patent application Ser. No. 10/198,643, filed Jul. 18, 2002 now U.S. Pat. No. 7,318,713, which is incorporated herein by reference.

FIELD OF THE INVENTION

The present invention relates generally to processing polymeric foam materials and, more particularly, to polymeric processing systems that include screws having short L:D ratios, as well as methods of retrofitting and using polymeric processing systems.

BACKGROUND OF INVENTION

Polymeric foam materials include a plurality of voids, also called cells, distributed within a polymer matrix. Microcellular foams (or microcellular materials) are a type of polymeric foam characterized by having small cell sizes and high cell densities. Microcellular foams may have a number of property and processing advantages.

Certain processing steps may be required (or preferred), when forming microcellular foams. The steps include introducing blowing agent into polymeric material within an extruder, sufficiently mixing the mixture of polymeric material and blowing agent to form a homogeneous mixture within the extruder, maintaining a high pressure within the homogeneous mixture to prevent premature nucleation of the microcells, and rapidly reducing the pressure to nucleate the microcells at a desired time.

Conventional injection molding or blow molding systems generally are not capable of satisfying all of the aforementioned steps needed to produce microcellular materials. Typically, conventional systems are designed with the intention of operating under a set of conditions inconsistent with the production of microcellular material. Consequently, new systems have been specifically designed and manufactured to produce microcellular materials. New injection molding or blow molding systems, for example, have been designed with screws that have relatively high L:D ratios (e.g., L:D ratios of 28:1 and greater). In particular, screws having these relatively high L:D ratios can enable sufficient mixing of the polymeric material and blowing agent mixture and maintenance of high pressure within the mixture, both of which promote formation of microcellular material. However, screws having high L:D ratios may be incompatible with existing conventional equipment used in injection and blow molding systems. Furthermore, it may be more expensive to produce new or retrofitted systems that include screws having high L:D ratios.

SUMMARY OF THE INVENTION

The invention provides polymer processing systems and associated methods. The invention rests, in part, on the recognition that screws having low L:D ratios may be used in connection with injection molding or blowing molding systems (which may have been conventional, non-microcellular systems) to produce microcellular polymeric materials. Such screws may be used when retrofitting existing conventional injection molding or blowing molding systems to enable production of microcellular material.

In one embodiment, the invention provides a polymer processing system operable to cyclically inject polymeric material into a mold or to cyclically eject polymeric material from a die. The system comprises a screw mounted within a barrel to define a polymer processing space between the screw and the barrel. The screw has an L:D ratio of less than or equal to about 24:1. The system further comprises a source of blowing agent connected to a blowing agent port to permit blowing agent flow from the source to polymeric material within the polymer processing space.

In another embodiment, the invention provides a method of processing polymeric material. The method comprises conveying polymeric material in a polymer processing space defined between a screw, having an L:D ratio of less than or equal to about 24:1, and a barrel. The method further comprises introducing blowing agent into the polymeric material within the polymer processing space to form a mixture of polymeric material and blowing agent; and injecting the mixture of polymeric material and blowing agent into a mold, or ejecting the mixture of polymeric material from a die.

In another embodiment, the invention provides a method of retrofitting a system, previously used to process polymeric material, comprising an extruder including a first screw having a length and a diameter. The system being operable to cyclically inject polymeric material into a mold or to cyclically eject polymeric material from a die to form microcellular polymeric material. The method comprising replacing the first screw with a replacement screw having an L:D ratio of less than about 24:1; and connecting a source of blowing agent to a port to provide a pathway for blowing agent flow from the source to a polymer processing space defined between the replacement screw and the barrel, when the replacement screw is mounted within the barrel.

In another embodiment, the invention provides a method of retrofitting a system previously used to process polymeric material by cyclically injecting polymeric material into a mold or cyclically ejecting polymeric material from a die. The system comprises an extruder including a first screw having a length and a diameter. The method comprising replacing the first screw with a replacement screw having a length substantially equal to the length of the first screw and an L:D ratio of less than about 24:1. The replacement screw including a restriction element positioned upstream of a blowing agent port formed in a barrel when the replacement screw is mounted in the barrel. The restriction element is designed to restrict the upstream flow of polymeric material therethrough during at least a portion of an injection or an ejection cycle. The replacement screw further including a tip valve positioned at a downstream end of the replacement screw. The tip valve permitting downstream flow of polymeric material therethrough in an open configuration and restricting upstream flow of polymeric material therethrough in a closed configuration.

In another embodiment, the invention provides a method of retrofitting a system previously used to process polymeric material by cyclically injecting polymeric material into a mold or cyclically ejecting polymeric material from a die. The system comprises an extruder including a first screw having a length and a diameter. The method comprising extending the downstream end of the barrel, e.g. by affixing an extension to the downstream end of the barrel, the extended portion including one or more blowing agent injection ports, and replacing the first screw with a replacement screw having a length greater (substantially greater, in some embodiments) than the length of the first screw. The replacement screw includes a restriction element positioned upstream of the location where a blowing agent port exists in the barrel, when the replacement screw is mounted in the barrel. The restriction element is designed to restrict the upstream flow of polymeric material therethrough during at least a portion of an injection or an ejection cycle. The replacement screw can also include, in one embodiment, a tip valve positioned at its downstream end. The tip valve permits downstream flow of polymeric material therethrough in an open configuration and restricts upstream flow of polymeric material therethrough in a closed configuration.

Other advantages, features, and uses of the invention will become apparent from the following detailed description of non-limiting embodiments of the invention when considered in conjunction with the accompanying drawings, which are schematic and which are not intended to be drawn to scale. In the figures, each identical or nearly identical component that is illustrated in various figures typically is represented by a single numeral. For purposes of clarity, not every component is labeled in every figure, nor is every component of each embodiment of the invention shown where illustration is not necessary to allow those of ordinary skill in the art to understand the invention. In cases where the present specification and a document incorporated by reference include conflicting disclosure, the present specification shall control.

DETAILED DESCRIPTION

Injection molding and blow molding systems that include screws having low L:D ratios are provided. The systems are capable of producing microcellular polymeric materials. In some cases, the systems may be formed by retrofitting conventional polymer processing systems. Retrofitting may involve changing (e.g., machining or replacing) existing components of the conventional system, as well as, adding new components to the system. For example, retrofitting generally involves replacing the conventional polymer processing screw with a new screw designed to satisfy conditions needed for processing microcellular materials, as described further below. In other cases, the systems may be newly manufactured. The retrofitted or newly manufactured systems of the invention may be considerably less expensive than newly manufactured microcellular processing systems having higher L:D ratios.

Figure 1:
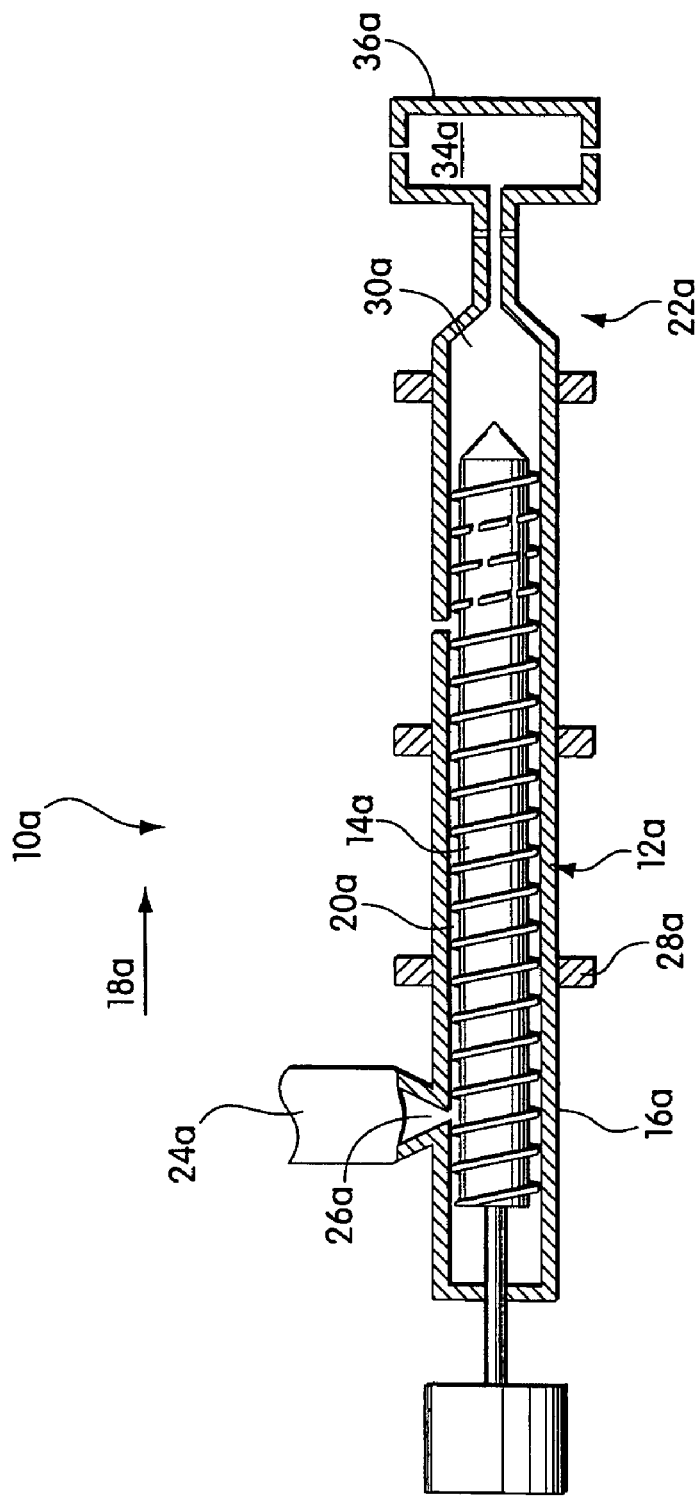
FIG. 1 illustrates a conventional injection molding system used to process solid polymeric material.

FIG. 1 schematically illustrates a conventional injection molding system 10a prior to being retrofitted according to methods of the present invention. In the illustrative embodiment, system 10a is used to injection mold solid polymeric material articles. Extruder 12a of the system includes a polymer processing screw 14a that is rotatable within a barrel 16a to convey polymeric material in a downstream direction 18a within a polymer processing space 20a defined between the screw and the barrel. In some cases, screw 14a has an L:D ratio of less than or equal to 24:1. At the beginning of a typical molding cycle, screw 14a is positioned at a downstream end 22a of the barrel. Polymeric material, typically in pelletized form, is fed into polymer processing space 20a from a hopper 24a through a hole 26a. Barrel 16a may be heated by one or more heating units 28a mounted on an exterior surface of the barrel. Screw 14a rotates to plasticate polymeric material and to convey the polymeric material into a region 30a within the barrel downstream of the screw. Polymeric material accumulates in region 30a and forces the screw axially in an upstream direction in the barrel. After a sufficient charge of the polymeric material has been accumulated, the screw ceases to rotate and stops moving in the upstream direction. Then, the screw is moved axially in a downstream direction to inject the accumulated charge of polymeric material through an outlet 32a of the extruder and into a cavity 34a of an injection mold 36a. The polymeric material within the mold is cooled, after which the mold is opened to produce a solid, polymeric article.

It should be understood that the system may be any type of injection molding system known in the art including injection molding systems that utilize accumulators external of the barrel. It should also be understood that blow molding systems may also be retrofitted in accordance with the present invention. Accordingly, the conventional system that is retrofitted according to methods of the invention may include a number of differences relative to the system shown in the illustrative embodiment.

Figure 2:
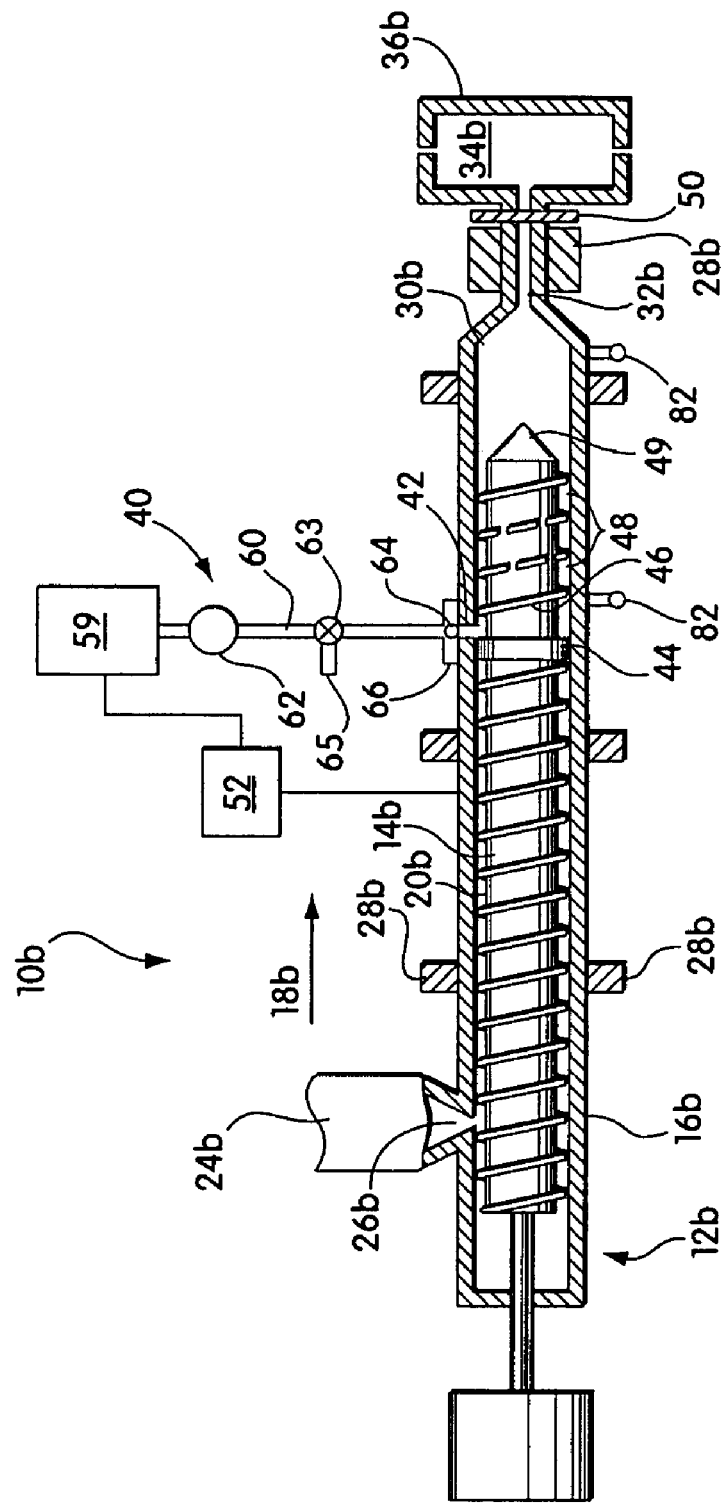
FIG. 2 illustrates a retrofitted injection molding system according to one embodiment of the present invention.

FIG. 2 illustrates a retrofitted injection molding system 10b according to one embodiment of the present invention. Injection molding system 10b has been modified to enable the production of microcellular material. System 10b includes a blowing agent introduction system 40 which introduces blowing agent into polymeric material within polymer processing space 20b in extruder 12b. Barrel 16b has been modified to include a port 42 through which the blowing agent is introduced. Screw 14b include a restriction element 44 positioned upstream of blowing agent port 42, a wiping section 46 at the blowing agent port, a mixing section 48 downstream of the blowing agent port, and a tip valve 49 positioned at a downstream end of the screw, as described further below. In some cases, as described further below, screw 14b may have a relatively short L:D ratio, which may be substantially the same length, and/or L:D ratio, as screw 14a. A shut-off nozzle valve 50 has been added between the outlet of the extruder and mold cavity 34b. System 10b may optionally include a control system 52 which controls the operation of one or more components of the molding system (e.g., blowing agent introduction system, extruder, etc.). As described further below, these modifications to the retrofitted system promote the formation of microcellular material articles by controlling blowing agent introduction into polymeric material within the extruder, forming a homogeneous blowing agent and polymeric material mixture within the extruder, and maintaining sufficient pressure within that mixture prior to the nucleation step, amongst other features.

When forming microcellular material using system 10b, introduction system 40 introduces blowing agent into polymeric material in a controlled manner as the material is being conveyed in downstream direction 18b to form a mixture of polymeric material and blowing agent in polymer processing space 20b. The mixture is mixed in mixing section 48 of the screw to form a homogeneous mixture which accumulates in a region 30b downstream of the screw. It may be preferable for the mixture to be a single-phase solution in which the blowing agent is dissolved in the polymeric material. Accumulation of the mixture in region 30b creates a pressure that forces the screw axially in an upstream direction of the barrel. During accumulation, shut-off nozzle valve 50 is in a closed configuration to maintain pressure within the accumulated charge sufficiently high to prevent premature nucleation, foaming or gas dissolution.

After a sufficient charge of the mixture has been accumulated, screw 14b ceases to rotate, and stops moving in the upstream direction. Then, the screw is moved axially and the shut-off nozzle valve is opened to inject the mixture of polymeric material and blowing agent into cavity 34b of the injection mold. Tip valve 49 limits or substantially prevents back flow (i.e., in an upstream direction) of the accumulated mixture during injection. Restriction element 44 limits or substantially prevents upstream flow of the mixture within the polymer processing space during injection to maintain the pressure and, thus, prevent premature nucleation, foaming or gas dissolution. Furthermore, the restriction element may reduce or prevent blowing agent from passing upstream of the blowing agent port and out the feed throat.

The sequence of closing for restriction element 44 and tip valve 49 can be controlled through design of the two elements. In some embodiments, it may be preferred that restriction element 44 closes at the same time or after tip valve 49 closes.

Due to the pressure difference in the mixture upon injection into the mold, blowing agent dissolved in the polymeric material comes out of solution to nucleate a plurality of microcell sites. The nucleated sites grow into microcells and the article is cooled within the mold. The mold may then be opened to produce a microcellular foam article. The cycle may be repeated to form additional molded microcellular articles. To control the timing of cell nucleation or cell growth, either mechanical or gas counterpressure in the mold can be used in some embodiments if desired.

It should be understood that, in some embodiments, the retrofitted system may not include all of the modifications shown in FIG. 2. Furthermore, it should be understood that retrofitted system may be a blow molding system or another type of injection molding system. It should also be understood that the invention also provides systems that are newly manufactured and, thus, not retrofitted. The newly manufactured system may be similar to the system shown in FIG. 2 and may include, for example, screws having short L:D ratios as described further below.

Blowing agent introduction system 40 is added to retrofitted system 10b to introduce blowing agent into polymeric material within the extruder in a controlled manner. The blowing agent introduction system includes a source 59 of blowing agent which is connected to port 42 formed in the barrel, as described further below, via conduit 60. Source 59 may supply any type of physical blowing agent known to those of ordinary skill in the art including atmospheric gases (e.g., nitrogen, carbon dioxide), hydrocarbons, chlorofluorocarbons, noble gases, or mixtures thereof. In some cases, it may be preferred for the source to provide carbon dioxide as a blowing agent. In other cases, it may be preferred for the source to provide nitrogen as a blowing agent. In some embodiments, solely carbon dioxide or nitrogen is used. The blowing agent may be supplied in any flowable physical state, for example, a gas, liquid, or supercritical fluid. In some cases, blowing agents that are in the supercritical fluid state after introduction into the extruder, (and, optionally, before injection as well), such as supercritical carbon dioxide and/or supercritical nitrogen, are especially preferred in certain embodiments.

A source of a supercritical blowing agent, i.e., a blowing agent contained under conditions in which it is supercritical, or a non-supercritical blowing agent in combination with equipment designed to place the blowing agent under conditions rendering it supercritical, may be included in retrofitting equipment in accordance with the invention. In one embodiment, retrofitting equipment does not include a source of blowing agent, but includes a system capable of placing a blowing agent under supercritical conditions prior to or after entry into polymer processing apparatus. Similarly, other equipment described herein, such as mass flow metering equipment, bypass valves, injector valves, multi-orifice ports, devices for measuring various conditions, restriction elements, shut-off nozzles, control systems, etc., can be included in retrofitting equipment.

A metering device 62 may be connected to an outlet of the source 59 to monitor and control the flow rate of blowing agent supplied by the source. Metering device 62 may be any of the type known in the art. In some embodiments, the metering device meters the mass flow rate of the blowing agent. In these embodiments, the mass flow rate of the blowing agent supplied by the source may be varied over a wide range as required by the particular process. For example, the blowing agent mass flow rate is generally between about 0.001 lbs/hr and 100 lbs/hr, in some cases between about 0.002 lbs/hr and 60 lbs./hr, and in some cases between about 0.02 lbs./hr and about 10 lbs./hr. It should be understood that, in some embodiments, the flow of blowing agent into the polymeric material may be discontinuous as a result of the discontinuous plastication of polymeric material in certain processes (e.g., injection mold processes).

The mass flow rate of blowing agent may also be determined, controlled, and maintained by using a known pressure differential across a calibrated orifice. Furthermore, it may be desired to use a critical flow orifice. Numerous other system designs are available for controlling the flow of blowing agent. It is also envisioned that blowing agents may be injected into the molten polymer volumetrically. The mass flow rate or volume of blowing agent into the polymeric material in the extruder may be controlled in some cases to create a mixture having a desired weight percentage of blowing agent depending on the particular process. In general, the blowing agent level in the mixture is generally less than about 15% by weight of polymeric material and blowing agent mixture. In many embodiments, the blowing agent level is less than about 8%, and others less than about 5%, in others less than about 3%, in others less than about 1%, and still others less than about 0.1% or even lower percent by weight of polymeric material and blowing agent mixture.

In some cases, the blowing agent introduction system includes a bypass valve 63 positioned between source 59 and port 42. When the bypass valve is in a closed configuration, the flow of blowing agent from the source to the port is diverted through the bypass valve and, in some cases, through a bypass passageway 65. The blowing agent may be, for example, diverted through the bypass passageway and released to the atmosphere reintroduced to source 59 or recirculated back into the system prior to the pump. When the bypass valve is in an open configuration blowing agent may flow from the source to the port. Suitable bypass valve designs and arrangements have been described in, commonly owned, U.S. patent application Ser. No. 09/782,673, filed Feb. 13, 2001, entitled "Blowing Agent Delivery System," which is incorporated herein by reference. The presence of a bypass valve may be particularly useful, for example, when it is desired to have a constant blowing agent flow from the source and a discontinuous flow of blowing agent into the polymeric material (e.g., during discontinuous plasticating processes such as injection molding). It should also be understood that retrofitted system 10*b* may not include a bypass valve or bypass passageway in certain embodiments.

Blowing agent introduction system also may include an injector valve 64 positioned between source 59 and port 42. When the injector valve is in an open configuration, the flow of blowing agent from the source to the polymeric material in the extruder is stopped. When the injector valve is in an open configuration, blowing agent from the source is permitted to flow through the valve and into the polymeric material in the extruder. Therefore, the injector valve may be used to selectively control the introduction of blowing agent into the polymeric material in the retrofitted system. In some embodiments, the blowing agent introduction system includes injector valve 64 and bypass valve 63 to control blowing agent introduction. In these embodiments, the operation of the injector valve may be coupled with the operation of the bypass valve, for example, using control system 52. In some embodiments, the injector valve may be combined with the bypass valve in a single device.

Figure 3:
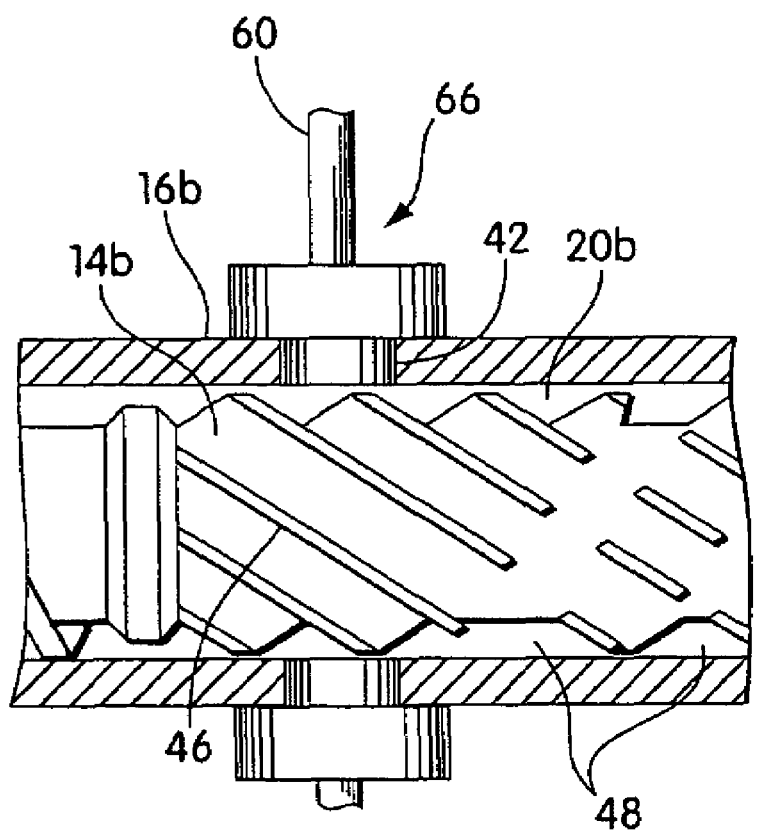
FIG. 3 illustrates a blowing agent port and injection assembly according to one embodiment of the present invention.
Figure 4:
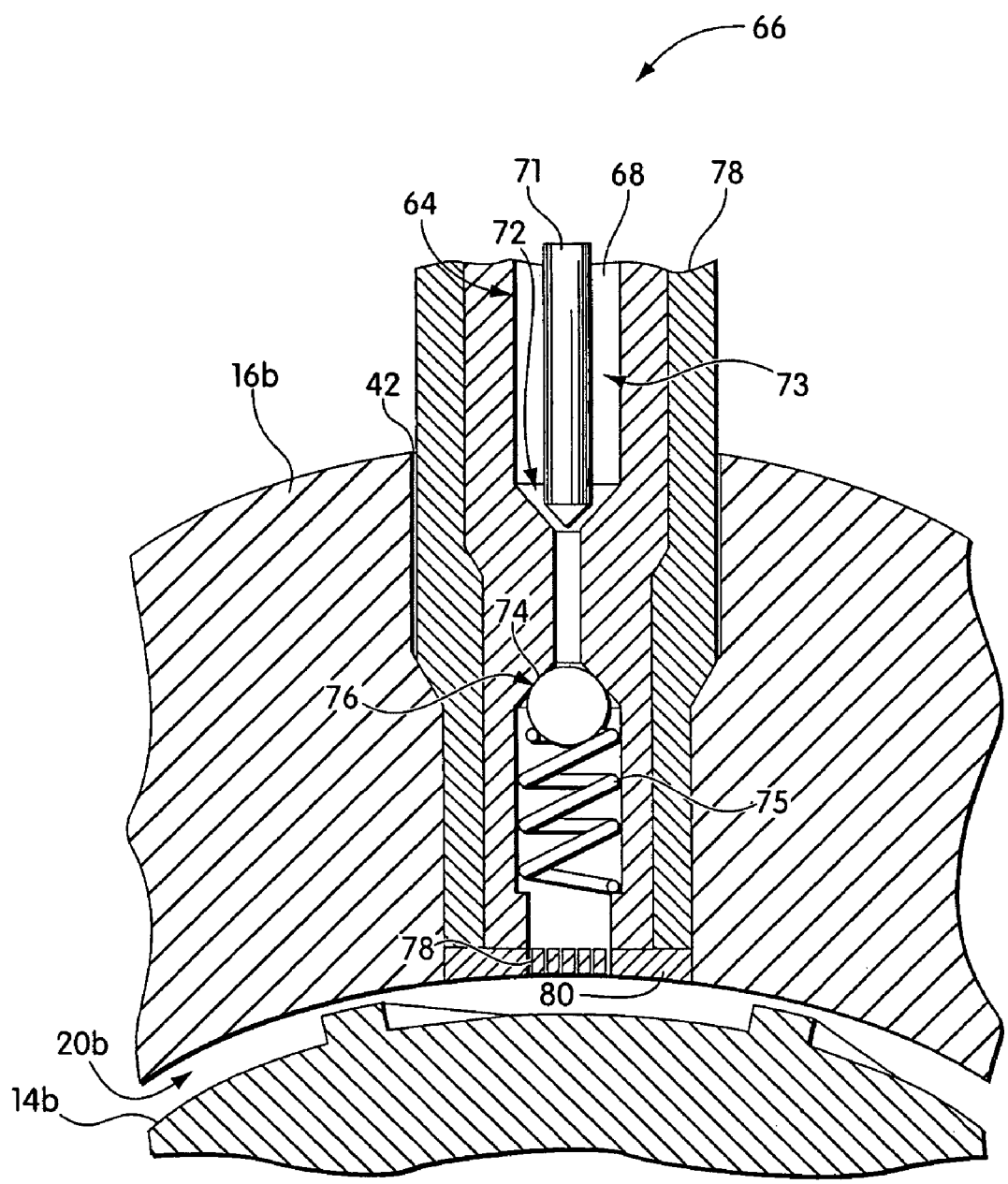
FIG. 4 illustrates a blowing agent injection assembly according to one embodiment of the present invention.

It may be preferable to position the injector valve close to port 42, so as to reduce the volume of blowing agent that may be confined in the conduit after the injector valve and prior to the blowing agent port. FIGS. 3 and 4 show the injector valve as part of an injector assembly that is inserted within the port, thus, reducing the distance between the injector valve and the port. As shown, the injector valve is formed, in part, from an injector body 68 that is inserted within an injector sleeve 70. The illustrated valve includes a valve stem 71 which is actuatable, for example by compressed air, relative to a valve seat 72 to open or close the valve. In the open position (as shown in FIG. 4), the valve stem is separated from the valve seat to provide a pathway that permits blowing agent to flow through an internal passageway 73 of the valve that is connected to conduit 60. In the closed position, the valve stem contacts the valve seat thereby creating a seal that prevents the flow of blowing agent therepast. Injector body 68 also may optionally include a back-flow valve. As illustrated, the back-flow valve includes a ball check 74 which is upwardly biased and held in position by a spring 75, though other valve constructions may also be used. Typically, when the shut-off valve is open, the pressure of the blowing agent forces the ball check 74 away from a sealing surface 76 to provide a pathway for blowing agent flow to port 42. Suitable blowing agent injector assemblies have been described in commonly owned, U.S. patent application Ser. No. 09/710,756, filed Nov. 10, 2000, and entitled "Valve for Injection Molding", and commonly owned, U.S. patent application Ser. No. 09/782,673, filed Feb. 13, 2001, and entitled "Blowing Agent Delivery System", the disclosures of which are incorporated herein by reference. It should also be understood that other injector valve designs may be suitable.

In some cases, though not all cases, it may be desirable to introduce blowing agent into the polymeric material in the polymer processing space through a plurality of orifices associated with port 42. Blowing agent introduction through a plurality of orifices, for example, may promote formation of a uniform mixture of polymeric material and blowing agent. In the embodiment shown in FIG. 4, a lower surface 80 of injector sleeve 70 has a plurality of orifices 78 formed therein through which blowing agent is injected. When injector assembly 66 is positioned in port 42, the lower surface 80 of the sleeve is aligned with an inner surface of barrel 16*b*. In some cases, the lower surface 80 has at least about two orifices defined therein, in others at least about ten, in others at least about forty, in others at least about one hundred, in others at least about five hundred orifices formed therein.

It should also be understood that other suitable blowing agent delivery systems and/or injector assemblies may also be used in connection with retrofitted system 10*b*. In some cases, retrofitted system 10*b* may not include a separate blowing agent injector assembly. In some cases, system 10*b* may introduce blowing agent through a single orifice (e.g., the port, itself). In some cases, the blowing agent introduction system may include additional components that are not illustrated herein, such as a pump to increase the pressure of the blowing agent prior to introduction into the polymeric material, or a pressure regulator that controls the pressure of the blowing agent, amongst others.

As described above, barrel 16*b* of retrofitted system 10*b* has port 42 formed therein through which blowing agent is introduced into the polymeric material within polymer processing space 20*b*. In some cases, barrel 16*a* from conventional system 10*a* (FIG. 1) may be machined to form barrel 16*b* which includes the port (and, optionally, other features as described below). In other cases, a newly manufactured barrel may be used to replace barrel 16*a* when creating retrofitted system 10*b*. It may be advantageous to machine the barrel from the conventional system to form barrel 16*b* because it may be less expensive than manufacturing a new barrel.

Barrel 16*b* may include more than one blowing agent port 42. The introduction of blowing agent through a plurality of ports located at different positions in the barrel, for example, may promote formation of a uniform mixture of polymeric material and blowing agent. When multiple ports are utilized, the ports can be arranged radially about the barrel (see FIG. 3), or axially along the length of the barrel. When arranged axially along the length of the barrel, the ports can facilitate injection of blowing agent at a relatively constant location relative to the screw, which moves upstream within the barrel as an accumulated charge is formed in region 30*b*. In this arrangement, a separate injector valve may be provided at each location along the barrel at which blowing agent is injected. The injector valves may be opened and closed so as to control injection blowing agent at the desired location relative to the position of the screw. These valves can be controlled as a function of time or screw position. A suitable axial arrangement of ports has been described in commonly-owned, U.S. patent application Ser. No. 09/335,946, filed Jun. 18, 1999, entitled "Injection Molding of Polymeric Material", which is incorporated herein by reference. Where radial-arranged ports are used, ports may be placed at the 12 o'clock and 6 o'clock position as shown in FIG. 3. In other cases ports may be placed at the 12 o'clock, 3 o'clock, 6 o'clock and 9 o'clock positions about the extruder barrel, or in any other configuration as desired.

Port(s) 42 are formed at a position in the barrel that enables formation of a homogenous mixture of polymeric material and blowing agent mixture within the polymer processing space prior to injection into the mold. Port(s) may be positioned relative to specific sections of the screw, as described further below. In systems which utilize a screw having an L:D ratio of 24:1, port(s) may be located at a screw position between about 16 and about 18 L:D. In systems that utilize a screw including a 20:1 L:D, ports may be positioned at a screw position between about 12 and about 16 L:D. It should be understood that other port positions may also be suitable. The blowing agent port may also stay fixed relative to the screw to give more consistent dosing of blowing agent into the molten polymer. This may be accomplished by a number of means including by an injector port that moves along the outside of the barrel in synchronization with the screw or by incorporating the injector port(s) into the screw itself, as described further below.

Figure 9:
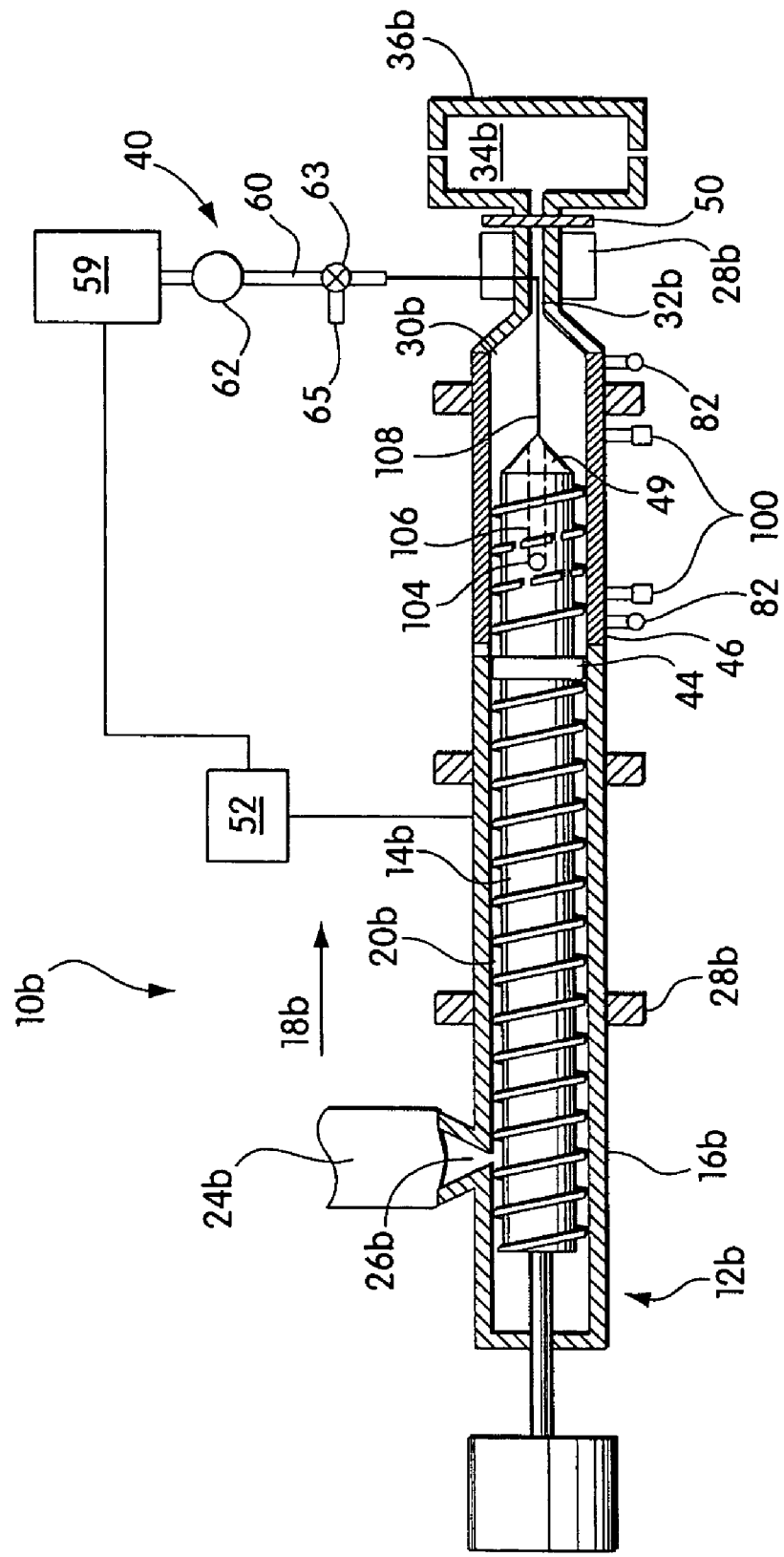
FIG. 9 illustrates a system in which blowing agent is injected through the screw using a blowing agent source line entering from the downstream end of the screw, according to one embodiment of the present invention.

FIG. 9 shows a system that includes a screw having a blowing agent port 104 formed in the screw. The port is connected to the source 59 via a lumen 106 formed in the screw. In some cases, the port may be formed in the vicinity of the wiping section, or the mixing section. The lumen may be connected to the blowing agent end conduit 108 at an upstream end, or a downstream end, of the screw. The embodiment of FIG. 9 advantageously reduces the amount of work required to retrofit the extruder barrel. An example of a screw suitable for use in this arrangement can be found in commonly-owned, U.S. patent application Ser. No. 09/335, 946, filed Jun. 18, 1999, entitled "Injection Molding of Polymeric Material", as well as International Patent Publication No. WO 00/26005, published May 11, 2000, entitled "Molded Polymeric Material Including Microcellular, Injection-Molded, and Low-Density Polymeric Material", each of which is incorporated herein by reference.

Barrel 16b may also have a number of other ports formed therein which are used for purposes other than blowing agent introduction. Other non-blowing agent port(s), for example, may provide measuring devices (e.g., pressure transducers, thermocouples, automatic or manual pressure relief valves and ports, rupture discs, etc.) access to polymeric material within polymer processing space 20b. Because processing of microcellular material may require more control over processing parameters (e.g., pressure and temperature), retrofitted system 10b may have measuring devices in positions where conventional systems do not have measuring devices. For example, system 10b may include pressure transducers 82 that measure pressure at a position near blowing agent introduction (e.g., less than about two screw diameters away from port 42) and/or at a position downstream of the screw (e.g., region 30b). In some cases, pressure measurement in these areas may increase control of the process, for example, by ensuring maintenance of sufficient pressure in these regions so that blowing agent remains dissolved in the polymeric material, amongst other reasons. In some cases, a pressure relief valve and/or port may be placed downstream of the blowing agent port(s) and upstream of the shutoff nozzle for safety reasons.

Port(s), both blowing agent and non-blowing agent, may be formed using known machining techniques. In some cases, port(s) may be formed to include seats to aid in the positioning of components therein (e.g., injector assembly 66). In these cases, the component may be held in the port using a clamping device. In other cases, the port(s) may be formed with a screw design into which the components are screwed.

In some cases, barrel 12b may be modified by attaching a modular barrel section 102 to the downstream end of barrel 12a. The modular section may be drilled with any of the following features: blowing agent injection port(s) 66, melt and pressure transducer tap(s) 82, rupture disk(s) 100, pressure relief valve(s), etc. The modular section may be attached to barrel section 12a using an adapter that includes two pieces 104 and 106 as shown. Piece 104 is attached to existing barrel 12a by bolts, press fitting, or other means and piece 106 is attached to piece 104 by bolts, threads, or other means. Numerous other configurations are possible for attaching the modular barrel extension 102 to the existing barrel 12a. For example, piece 106 may be an integral piece of the modular barrel extension.

As described above, the retrofitting methods of the present invention involve changing the design of screw 14a from conventional system 10a to screw 14b in order to enable production of microcellular material. In most cases, screw 14a is replaced by a newly-manufactured screw 14b. However, it should be understood that it may also be possible to machine screw 14a to create screw 14b.

Figure 5:
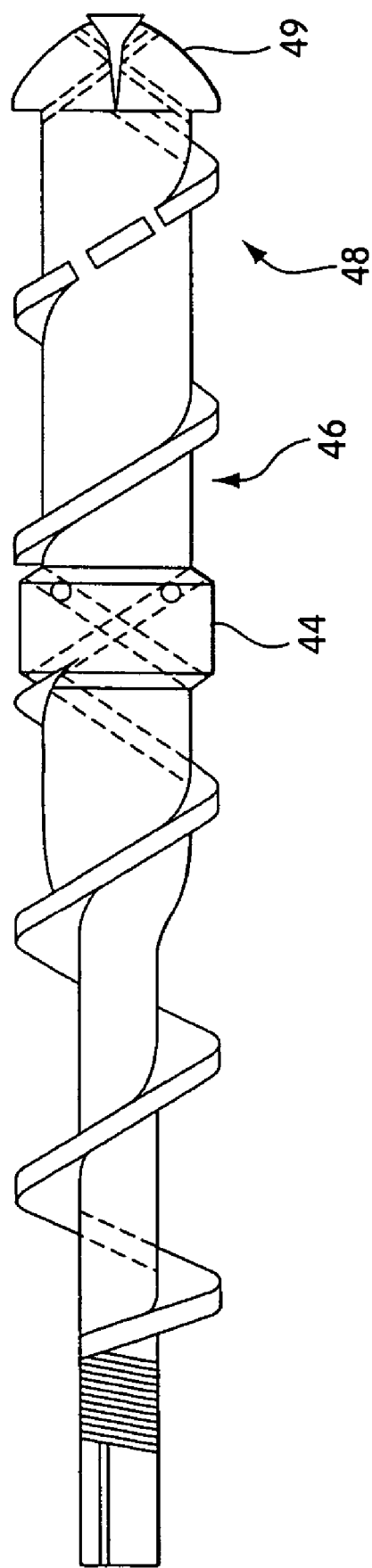
FIG. 5 illustrates a screw according to one embodiment of the present invention.

FIG. 5 shows screw 14b according to one embodiment of the present invention. Restriction element 44 is positioned upstream of blowing agent port 42 when the screw is mounted within the barrel. The restriction element restricts the upstream flow of polymeric material and blowing agent mixture in polymer processing space 20b, while the accumulated mixture is injected into the mold. The restriction element, thus, maintains the pressure of the mixture in the polymer processing space to prevent blowing agent from prematurely coming out of solution. For example, the restriction element may maintain the polymeric material downstream of the restriction element at a pressure of at least 1000 psi throughout the injection cycle; in other cases, at least about 2000 psi; or, at least about 3000 psi throughout the injection cycle.

In some cases, the restriction element is a valve which permits downstream flow of polymeric material therethrough in an open configuration and restricts upstream flow of polymeric material therethrough in a closed configuration. The valve, for example, may move from the closed configuration to the open configuration when the pressure of polymeric material downstream of the valve exceeds the pressure of polymeric material upstream of the valve. Suitable restriction element designs have been described in commonly-owned, U.S. Pat. No. 6,322,347, which is incorporated herein by reference.

Figure 6A:
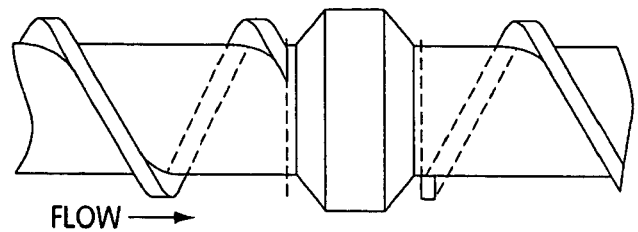
FIGS. 6A-6E illustrate various pressure restriction elements according to embodiments of the present invention.
Figure 6B:
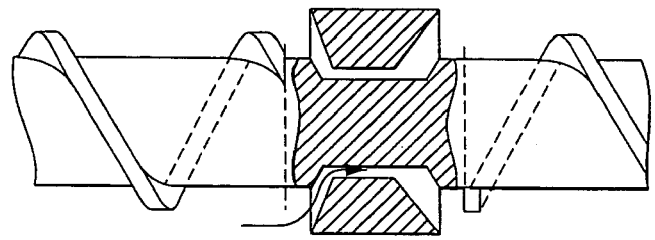
Figure 6C:
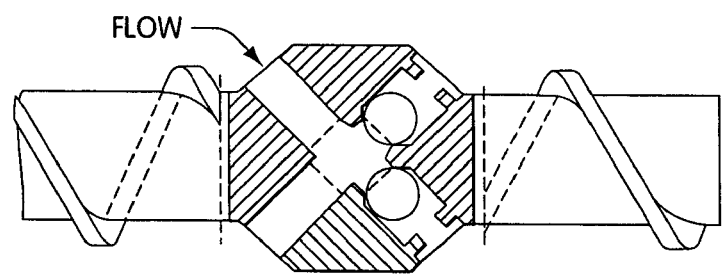
Figure 6D:
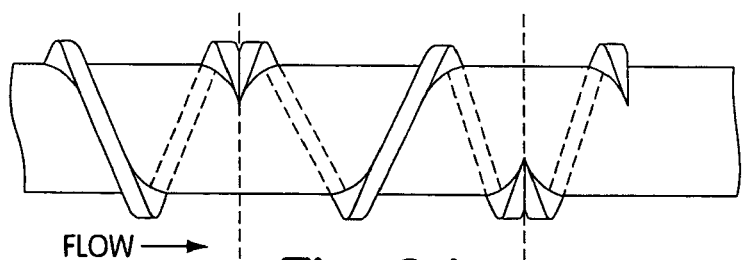
Figure 6E:
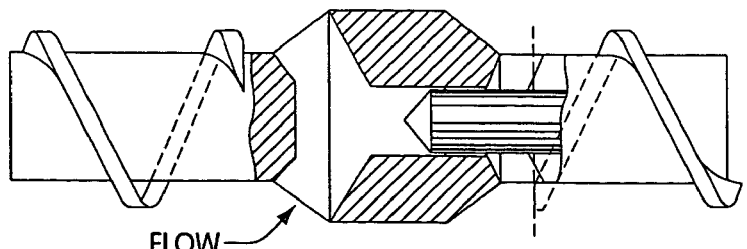

FIGS. 6A-6E show suitable restriction element designs. The designs include a blister ring (FIG. 6A), ring check valve (FIG. 6B), ball check valve(s) (FIG. 6C), reverse channel flight(s) (FIG. 6D) and center piston check valve (FIG. 6E). In some cases, the restriction element may be a center ring check valve that has a similar design as the tip valve. The center ring check valve and tip valve, for example, may be single- or multiple-stage closing action valves, spring or non-spring loaded valves, and single- or multiple-piece ring valves. In some cases, the restriction element may be one or more ball check valves. The ball check valve may have any of a number of designs, including spring or non-spring loaded and single- or multiple-stage closing action. The number of ball check valves may depend on several factors including polymer flow rate, material viscosity, screw diameter, and ball check diameter. The ball check may also be machined directly into the screw or may be of a sleeve design for easy removal and replacement for cleaning or repair. The sleeve may be held in place by threads, set screw(s), snap fit, magnetic or other mechanical means. In some cases, the restriction element may be a center piston check valve. The center piston check valve may have a design similar to the tip valve. Suitable designs include spring or non-spring loaded action center piston check valves.

Screw 14b includes mixing section 48 positioned downstream of the restriction element. The mixing section is also typically positioned downstream of port 42 when the screw is mounted in the barrel. The mixing section enhances the mixing of the blowing agent and polymeric material; the mixing could be distributive or dispersive or any combination of the two. The enhanced mixing may enable formation of a single-phase solution of polymeric material and blowing agent which is desirable for microcellular processing. As shown, the mixing section includes broken screw flights. However, it should be understood that the mixing section may also be of other known designs including Maddock, pineapple, pin, gear, and kneading mixers (and combinations thereof). The length of the mixing section may depend upon the specific system. In some cases, for example, the mixing section may have a length of between about two and about six times the screw diameter.

Screw 14b includes wiping section 46 positioned downstream of the restriction element and upstream of the mixing section. Wiping section 46 is positioned substantially at the port, when the screw is mounted in the barrel. As shown, the wiping section includes an unbroken screw flight. The screw flight passes beneath the blowing agent port (including orifices, if present) to enhance dispersion of blowing agent when introduced into the polymeric material. Also as stated above, if blowing agent addition occurs through the screw then the port(s) in the screw may be located at or near the wiping section. The wiping section, for example, may have a length of between about one-half and about three times the diameter of the screw.

Figure 7A:
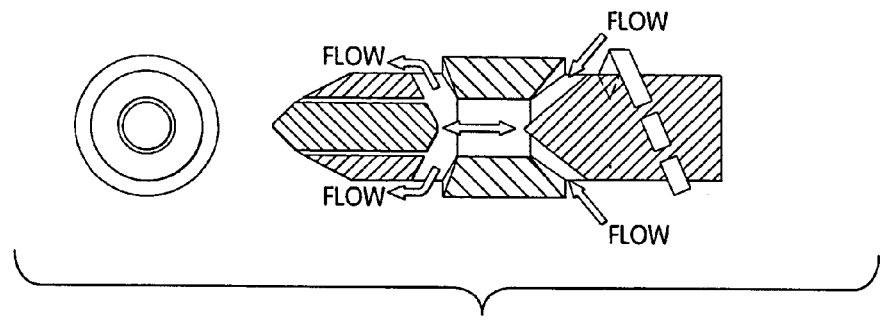
FIGS. 7A-7C illustrates various tip valves according to embodiments of the present invention.
Figure 7B:
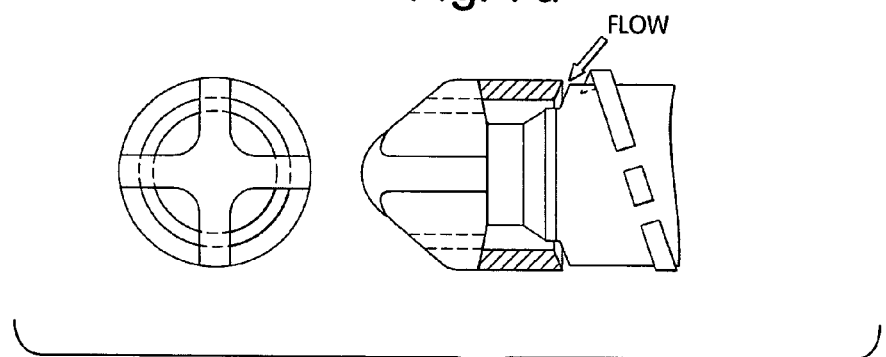
Figure 7C:
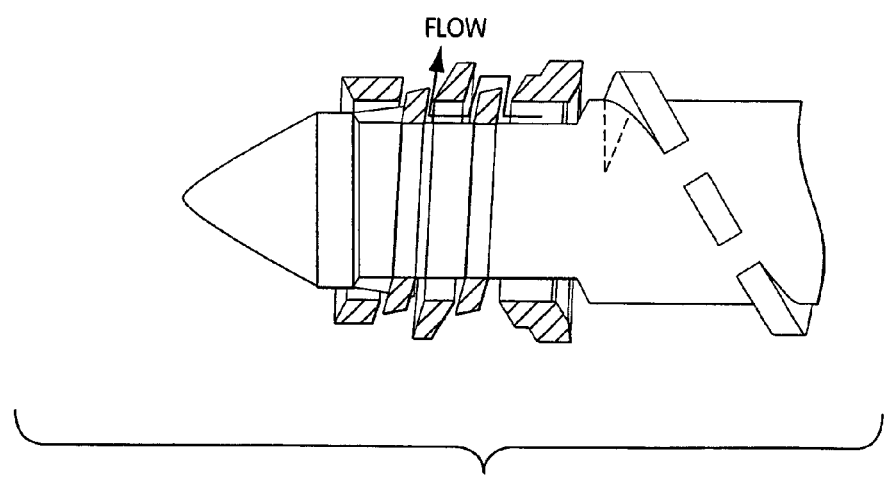
Figure 8:
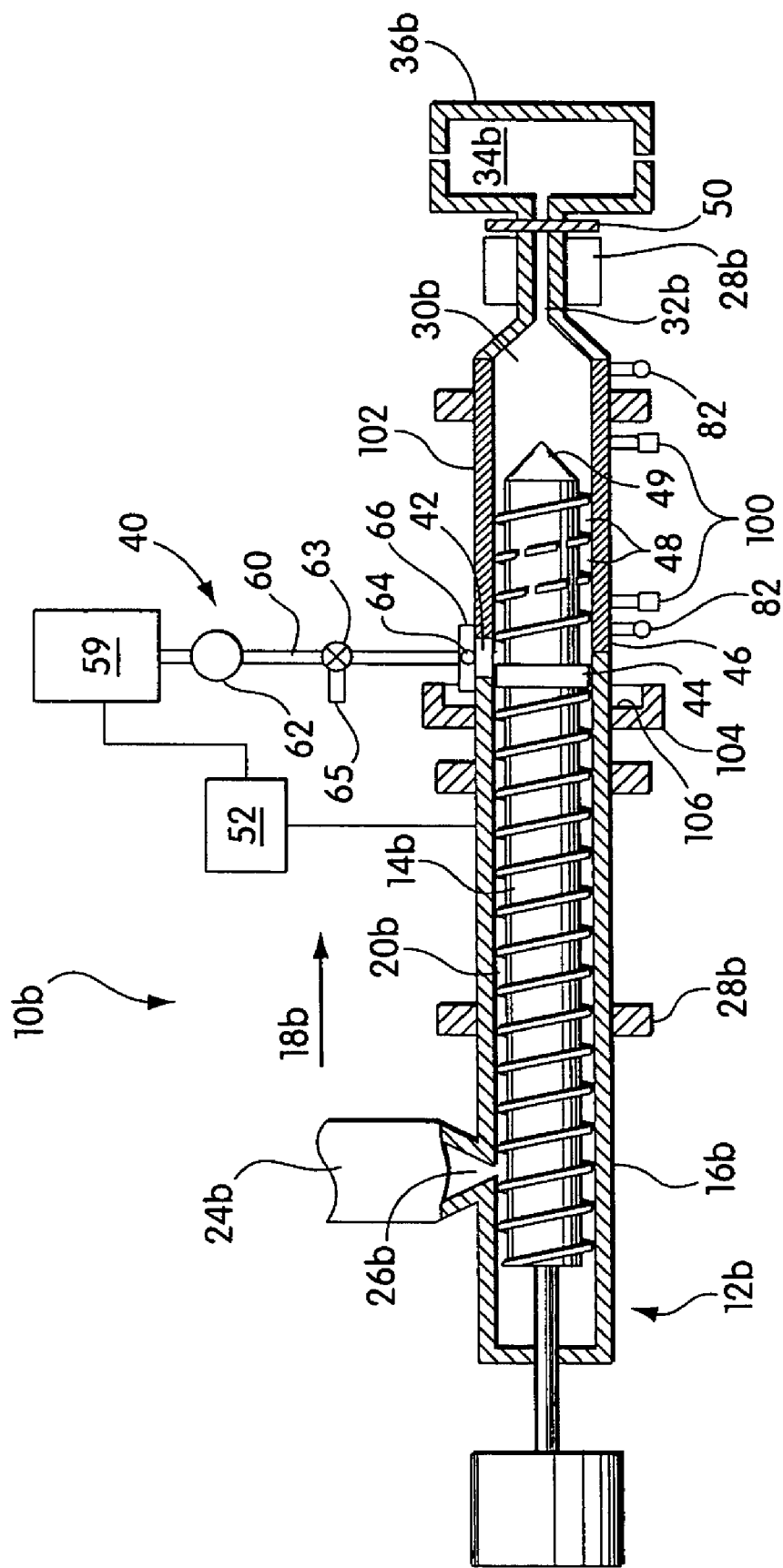
FIG. 8 illustrates a retrofitted system with a modular barrel extension according to one embodiment of the present invention.

Screw 14b includes tip valve 49 positioned at a downstream end of the screw. Tip valve 49 is open to permit the accumulation of the polymeric material and blowing agent mixture in region 30b. During the injection of the mixture, the tip valve is closed to prevent the upstream flow of the accumulated mixture. The tip valve, thus, maintains the pressure of the mixture in the region 30b to prevent blowing agent from prematurely coming out of solution. The tip valve may have a number of designs including a sliding piston design (FIG. 7A) or a sliding ring check design (7B). The tip valve may close by pressure, spring action, or other mechanical means and may have one or multiple stage closing action. The tip valve may also include mixing and pumping capabilities to help develop the single phase solution of blowing agent and molten polymer as shown in FIG. 7C. As described above, the tip valve may be designed to balance the closing speed to coordinate with the closing speed of the center pressure restriction element 44.

As described above, the L:D ratio of screw 14b may be less than about 24:1. This condition may simplify the retrofitting method by increasing the compatibility of screw 14b with pre-existing components of system 10a. L:D ratios of 24:1 are less than the L:D ratios used in newly manufactured screws in prior art microcellular processing systems.

In some embodiments, screw 14b may have substantially the same length, and/or substantially the same diameter, and/or the substantially same length-to-diameter (L:D) ratio as screw 14a. In particular, in embodiments in which barrel 16a is machined to form barrel 16b, it may be preferable for screw 14b to have substantially the same length (and, even more preferable, substantially the same length, diameter, and L:D ratio) as screw 14a. The specific length, diameter, and L:D ratio of screw 14b depends on the system. In some cases, the L:D ratio of screw 14b may be between about 20:1 and about 24:1.

In some cases, it may be preferable for the diameter of screw 14b to be less than the diameter of screw 14a. For example, when screw 14b has the same length and smaller diameter than screw 14a, the increased L:D will allow greater mixing of the blowing agent and polymeric material as previously discussed. In these cases, for example, screw 14b may have an L:D ratio between about 24:1 and about 28:1.

It should be understood that screw 14b may have other designs than those illustrated and described herein. For example, the screw may not include all of the sections illustrated in FIG. 5. In some cases, the screw may not include a wiping section, a mixing section, or a tip valve. In some cases, the screw may include additional sections not described such as a decompression zone. In some cases, the screw may have other L:D ratios than those described herein.

As described above, retrofitted system 10b may include a shutoff nozzle valve 50 associated with the outlet of the extruder. During the accumulation of polymeric material in region 30b, the shut-off nozzle valve is in a closed configuration to maintain the pressure in the polymeric material/blowing agent mixture sufficiently high within the barrel. The high pressure ensures that blowing agent remains dissolved in a single-phase solution of polymeric material and blowing agent formed within the extruder. The opening of the injection valve permits flow of polymeric material into the mold and nucleation of the mixture upon introduction into the mold. One or more heating units 28b may be associated with the shutoff nozzle valve. Shutoff nozzles are available from numerous suppliers including Herzog AG (Degersheim, Switzerland) and most injection molding machine original equipment manufacturers.

It should be understood that a shut-off nozzle valve may not be present in certain systems, for example, in an extrusion blow molding system or in an injection molding machine with a valve-gated hot runner mold. A shutoff nozzle that is closed during injection and open during plastication may exist between a screw and plunger in a plunger injection molding system.

As described above, the system may optionally include control system 52; the control system may be associated with the extruder or the blowing agent delivery system. In some cases, the controller may be a separate component, such as may be required in retrofitting. Control system 52, when provided, may receive input signals from and send output signals to one or more components of the system. The control system may also receive manual input signals in response to entries by an operator. In particular, control system 25 may be used to synchronize the operation of the injection molding system and blowing agent introduction. Suitable control systems have been described in commonly-owned, U.S. patent application Ser. No. 09/826,603, entitled "Method and Apparatus for Controlling Foam Molding Processing", by Kim et. al., filed on Apr. 5, 2001, and commonly-owned, International patent application serial no. PCT/US02/14154, entitled "Injection Molding Systems and Methods", by Pierick et. al., filed on May 6, 2002, both of which are incorporated herein by reference.

In some cases, methods of the present invention may involve modifying mold 36a from conventional system 10a to create mold 36b in order to help the production of microcellular material. For example, if mold 36b includes a hot runner system, the mold may be modified to include a valve associated with each hot runner gate. The valve(s) are used to maintain pressure in the mixture of polymeric material and gas prior to introduction into the mold cavity. In some cases, mold 36b may be modified to include enhanced cooling capability, for example, by increasing fluid flow through passageways in the mold, by adding more cooling passageways to slides, runners, and the sprue, replacing mold parts with high conductivity metal replacements, and adding cooling pins. Additional modifications may include increasing cavity venting, moving gates to thin part sections, and changing the mold surface finish to improve the molded part surface appearance. It should also be understood that the mold may not be modified according to some of the retrofitting methods of the invention. It may be preferable not to modify the mold, for example, to save cost.

As described above, retrofitted system 10 may be used to form microcellular materials. Suitable microcellular materials have been described, for example, in International Publication No. WO 98/31521 (Pierick et. al.), which is incorporated herein by reference. Microcellular materials have small cell sizes and high cell densities. As used herein, the term "cell density" is defined as the number of cells per cubic centimeter of original, unfoamed polymeric material. As used herein, the term "average cell size" is the numerical average of the size of the cells formed in an article. The average cell size can be determined, for example, by scanning electron microscopy (SEM) analysis of a representative area of the article.

In some embodiments, the microcellular materials have an average cell size of less than 100 microns; in other embodiments, an average cell size of less than 50 microns; in other embodiments, an average cell size of less than 25 microns; in other embodiments, an average cell size of less than 10 microns; and, in still other embodiments, an average cell size of less than 1 micron. In some of these microcellular embodiments, the cell size may be uniform, though a minority amount of cells may have a considerably larger or smaller cell size. In some cases, different regions of the article may have cells of different size. For example, edge regions of the article may generally have a smaller cell size than interior regions of the article. Furthermore, edge regions may even have no cells while the interior region does.

In some cases, the microcellular materials have a cell density of greater than $10^6$ cells/cm$^3$, in others greater than $10^7$ cells/cm$^3$, in others greater than $10^8$ cells/cm$^3$, and in others greater than $10^9$ cells/cm$^3$.

Though the retrofitted systems of the invention typically are capable of producing microcellular materials, it should be understood that the retrofitted systems may also be used to produce non-microcellular polymeric foams.

The polymeric foam articles, including microcellular articles, produced using the retrofitted systems of the invention may be produced over a wide range of void fractions. Polymeric foams may be used that have a void fraction of between about 1% and about 99%. In some embodiments, higher density foams are used having a void fraction of less than 50%, in other cases a void fraction of less than 30%, and in some cases a void fraction of between about 5% and about 30%. The particular void fraction will depend upon the application.

The systems and methods of the invention may be used to form blow-molded, or injection molded articles. The articles may generally comprise any type of polymeric material. Suitable materials include thermoplastic polymers which may be amorphous, semicrystalline, or crystalline materials. Typical examples of polymeric materials include styrenic polymers (e.g., polystyrene, ABS), polyolefins (e.g., polyethylene and polypropylene), fluoropolymers, polyamides, polyimides, polyesters, polycarbonate, polyphenylene ether (PPE), thermoplastic elastomers, vinyl halides (e.g., PVC), acrylic (e.g., PMMA), acetal, other high temperature plastics (e.g., PEEK, PEKK, PES, PPS, PEKK, PEI, PPA) and the like. The article may also include any number of other additives known in the art such as reinforcing agents, lubricants, plasticizers, colorants, fillers, stabilizers and the like. Optionally, the articles may include a nucleating agent, such as talc or calcium carbonate. In many embodiments, the articles are free of a nucleating agent. The articles are generally free of residual chemical blowing agents or reaction byproducts of chemical blowing agents. The articles are also generally free of non-atmospheric blowing agents, for example, when the supercritical fluid additive is an atmospheric gas (e.g., nitrogen, carbon dioxide).

Those skilled in the art would readily appreciate that all parameters listed herein are meant to be exemplary and that the actual parameters would depend upon the specific application for which the methods and articles of the invention are used. It is, therefore, to be understood that the foregoing embodiments are presented by way of example only and that, within the scope of the appended claims and equivalence thereto, the invention may be practiced otherwise than as specifically described. Furthermore, it should be understood that the systems described to herein may be newly manufactured systems or retrofitted systems.

What is claimed is:

1. A method of processing polymeric material comprising:
   conveying polymeric material in a polymer processing space within a polymer processing system including only a single screw, the polymer processing space defined between the screw and a barrel, the screw having an L:D ratio of less than or equal to about 24:1; and
   injecting a mixture of polymeric material and blowing agent into a mold, or ejecting the mixture of polymeric material and blowing agent from a die, by moving the single screw in a downstream direction to form a microcellular material.

2. The method of claim 1, further comprising injecting a single-phase solution of blowing agent and polymeric material into the mold or ejecting a single-phase solution of polymeric material and blowing agent from the die.

3. The method of claim 2, further comprising nucleating the single-phase solution while injecting the single-phase solution into the mold, or while ejecting the single-phase solution from the die.

4. The method of claim 1, further comprising introducing blowing agent into the polymeric material to form a mixture of polymeric material and blowing agent and conveying the mixture of polymeric material and blowing agent in a downstream direction in the polymer processing space.

5. The method of claim 4, further comprising forming a single-phase solution of polymeric material and blowing agent in the polymer processing space, and injecting the single-phase solution into a mold or ejecting the single-phase solution from a die.

6. The method of claim 4, further comprising introducing a physical blowing agent into the polymeric material.

7. The method of claim 1, whereint he screw has an L:D ratio between about 20:1 and about 24:1.

8. The method of claim 1, wherein the microcellular material has an average cell size of less than 100 microns.

9. A method comprising:
   replacing a first screw of a first system including only a single screw previously used to process polymeric material with a single replacement screw having an L:D ratio of less than about 24:1 to produce a retrofitted system including the replacement screw mounted in a barrel, the retrofitted system being operable to cyclically inject polymeric material into a mold, or to cyclically eject polymeric material from a die, to form microcellular polymeric material.

10. The method of claim 9, further comprising connecting a source of blowing agent to a port to provide a pathway for blowing agent flow from the source to a polymer processing space defined between the replacement screw and the barrel.

11. The method of claim 10, wherein the blowing agent is either carbon dioxide or nitrogen.

12. The method of claim 10, further comprising forming the port in a barrel of the first system.

13. The method of claim 9, wherein the replacement screw includes a restriction element positioned upstream of the downstream end of the replacement screw, the restriction element restricting the upstream flow of polymeric material therethrough during at least a portion of an injection or an ejection cycle.

14. The method of claim 9, wherein the replacement screw includes a restriction element positioned upstream of a blowing agent port when the screw is mounted in the barrel.

15. The method of claim 9, wherein the replacement screw includes a tip valve positioned at a downstream end of the replacement screw.

16. The method of claim 9, wherein the replacement screw has a length and diameter substantially equal to the length and diameter of the first screw.

17. The method of claim 9, wherein the first screw and the replacement screw have an L:D ratio between about 20:1 and about 24:1.

18. The method of claim 9, wherein the diameter of the replacement screw is less than the diameter of the first screw.

19. The method of claim 9, further comprising connecting a control system to components of the retrofitted system, the control system designed to receive inputs from at least one component and send outputs to at least one component.

20. The method of claim 9, wherein the system is an injection molding system that includes an injection mold.

21. The method of claim 9, wherein the system is blow molding system.

22. The method of claim 9, further comprising conveying polymeric material in a downstream direction within a polymer processing space defined between the replacement screw and the barrel, and introducing blowing agent into the polymer processing space to form a polymeric material and blowing agent mixture.

23. The method of claim 22, further comprising forming a single-phase solution of polymeric material and blowing agent in the polymer processing space.

24. The method of claim 22, further comprising processing the polymeric material and blowing agent mixture to form a microcellular material.

25. The method of claim 9, wherein the microcellular material has an average cell size of less than 100 microns.

* * * * *

UNITED STATES PATENT AND TRADEMARK OFFICE
CERTIFICATE OF CORRECTION

PATENT NO. : 7,615,170 B2 Page 1 of 1
APPLICATION NO. : 11/027191
DATED : November 10, 2009
INVENTOR(S) : Jingyi Xu et al.

It is certified that error appears in the above-identified patent and that said Letters Patent is hereby corrected as shown below:

On the Title page Item (54), "METHOD OF PROCESSING POLYMERS USING A SINGLE SCREW" should be "POLYMER PROCESSING SYSTEMS INCLUDING SCREWS"

Column 1, lines 1-2, the title "METHOD OF PROCESSING POLYMERS USING A SINGLE SCREW" should be "POLYMER PROCESSING SYSTEMS INCLUDING SCREWS"

Column 14, Claim 7, line 40, "whereint he" should be "wherein the"

Signed and Sealed this

Sixth Day of April, 2010

David J. Kappos
*Director of the United States Patent and Trademark Office*